US008023758B2

(12) United States Patent
Hung et al.

(10) Patent No.: US 8,023,758 B2
(45) Date of Patent: Sep. 20, 2011

(54) SURFACE MESH MATCHING FOR LENS ROLL-OFF CORRECTION

(75) Inventors: Szepo Robert Hung, Carlsbad, CA (US); Jingqiang Li, San Diego, CA (US); Hsiang-Tsun Li, San Diego, CA (US); Xin Zhong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1078 days.

(21) Appl. No.: 11/835,220

(22) Filed: Aug. 7, 2007

(65) Prior Publication Data

US 2009/0043524 A1 Feb. 12, 2009

(51) Int. Cl.
*G06K 9/40* (2006.01)
(52) U.S. Cl. .................. 382/255; 356/124
(58) Field of Classification Search .............. None
See application file for complete search history.

(56) References Cited

U.S. PATENT DOCUMENTS

| 5,878,174 | A | 3/1999 | Stewart et al. |
| 6,002,525 | A | 12/1999 | Poulo et al. |
| 6,072,603 | A | 6/2000 | Parks |
| 7,151,560 | B2 | 12/2006 | Matherson et al. |
| 7,502,057 | B2 | 3/2009 | Whitman et al. |
| 2003/0234879 | A1* | 12/2003 | Whitman et al. ............. 348/242 |
| 2007/0291233 | A1* | 12/2007 | Culbertson et al. ............. 353/34 |
| 2009/0046944 | A1* | 2/2009 | Bilcu et al. .................... 382/274 |

FOREIGN PATENT DOCUMENTS

| EP | 1251461 | 10/2002 |
| EP | 1447977 A1 | 8/2004 |
| WO | WO 2006/005798 | * 1/2006 |

OTHER PUBLICATIONS

Bax, Michael R., "Real-time Lens Distortion Correction Using Texture Mapping," Proceedings of SPIE, vol. 5029 (2003), p. 249-256, Stanford, CA, USA.
Fernandes, J.C. Aparicio et al., "Fast Correction of Lens Distortion for Image Applications," IEEE Catalog No. 97TH8280, ISIE (1997), p. 708-712.
Nijmeijer, A.G.J. et al., "Correction of Lens-Distortion for Real-Time Image Processing Systems," University of Twente, p. 316-324.
Weng, Juyang et al., "Camera Calibration with Distortion Models and Accuracy Evaluation," IEEE Transactions on Pattern Analysis and Machine Intelligence, vol. 14, No. 10, Oct. 1992, p. 965-980.
Gouraud H., et al., "Continuous Shading of Curved Surfaces," IEEE Transactions on Computers, 1971, C-20 (6).
International Search Report and Written Opinion—PCT/US2008/072527, International Search Authority—European Patent Office—Jul. 31, 2009.
Steve Hill: "X.1 Tri-linear Interpolation and X.2 Faster linear interpolation" GRAPHIC GEMS IV, 1994, pp. 521-533, XP002536207 Edited by Pauls S. Heckbert Section "Linear Interpolation".
Yu W: "Practical Anti-Vignetting Methods 1-39 for Digital Cameras" IEEE Transactions on Consumer Electronics, IEEE Service Center, New York, NY, US, vol. 50, No. 4, Nov. 1, 2004, pp. 975-983, XP001224730.

* cited by examiner

*Primary Examiner* — Bhavesh Mehta
*Assistant Examiner* — Tahmina Ansari
(74) *Attorney, Agent, or Firm* — Matthew J. Evans; James R. Gambale, Jr.

(57) ABSTRACT

A two-dimensional (2D) mesh is applied over a distortion surface to approximate a lens roll-off distortion pattern. The process to apply the 2D mesh distributes a plurality of grid points among the distortion pattern and sub-samples the distortion pattern to derive corrected digital gains at each grid location. Non-grid pixels underlying grid blocks having a grid point at each corner are adjusted based on the approximation of the lens roll-off for the grid points of the grid block. In one example, bilinear interpolation is used. The techniques universally correct lens roll-off distortion irregardless of the distortion pattern shape or type. The technique may also correct for green channel imbalance.

39 Claims, 16 Drawing Sheets

1030

SURFACE MESH MATCHING FOR LENS ROLL-OFF CORRECTION

BACKGROUND

I. Field

The present disclosure relates generally to the field of image processing and, more specifically, to techniques for universally correcting lens roll-off distortion and/or green channel distortion.

II. Background

Due to the cost-saving consideration and size issue, the lens mounted on the camera of a cell phone tends to be small and inexpensive. Because of its small size and inferior material, the captured image shows brightness attenuation near the edge of the image. The luminance of the pixels near the edge is considerably darker than the pixels in the center. Furthermore, the color tone may also shift.

In one attempt to correct the roll-off distortion, a radial-based lens roll-off correction method was employed. However, due to the placement of micro lens on the pixel array for high pixel count sensors, the color shift is not radially symmetric. Instead, it is globally directional. Thus, the distortion was marginally improved. Furthermore, there are varying types of roll-off patterns such as, a kidney type, oval shape and radially symmetric roll-off patterns. For an aspherical lens creating the kidney type, radial symmetry assumption is violated in the radial-based lens roll-off correction method. Likewise, the oval shape roll-off pattern violates a circular symmetry assumption of the radial-based lens roll-off correction method.

When the image sensor pixel count increases, the photo diode size shrinks in order to maintain a reasonable die size. Due to the pixel downsizing, the green channel imbalance becomes a serious issue.

There is therefore a need in the art for techniques for universally correcting lens roll-off distortion and/or green channel imbalance.

SUMMARY

Techniques for universally correcting lens roll-off distortion and/or green channel imbalance are described herein. In one configuration, an apparatus comprises a processing unit to implement a set of operations to apply a two-dimensional (2D) mesh with a plurality of grid blocks over a distortion surface to approximate a lens roll-off distortion, and to adjust non-grid pixels (NGPs) in the distortion surface underlying a corresponding grid block based on the approximation for the corresponding grid block to correct for the lens roll-off distortion. The apparatus further includes a memory coupled to the processing unit.

In another configuration, a computer program product includes a computer readable medium having instructions for causing a computer to apply a two-dimensional (2D) mesh with a plurality of grid blocks over a distortion surface to approximate a lens roll-off distortion. The instructions also cause a computer to adjust non-grid pixels (NGPs) in the distortion surface underlying a corresponding grid block based on the approximation for the corresponding grid block to correct for the lens roll-off distortion.

In a still further configuration, a device includes applying means for applying a two-dimensional (2D) mesh with a plurality of grid blocks over a distortion surface to approximate a lens roll-off distortion. The device also includes adjusting means for adjusting non-grid pixels (NGPs) in the distortion surface underlying a corresponding grid block based on the approximation for the corresponding grid block to correct for the lens roll-off distortion.

Additional aspects will become more readily apparent from the detailed description, particularly when taken together with the appended drawings.

BRIEF DESCRIPTION OF THE DRAWINGS

Aspects and configurations of the disclosure will become more apparent from the detailed description set forth below when taken in conjunction with the drawings in which like reference characters identify corresponding elements throughout.

Figure 1A:
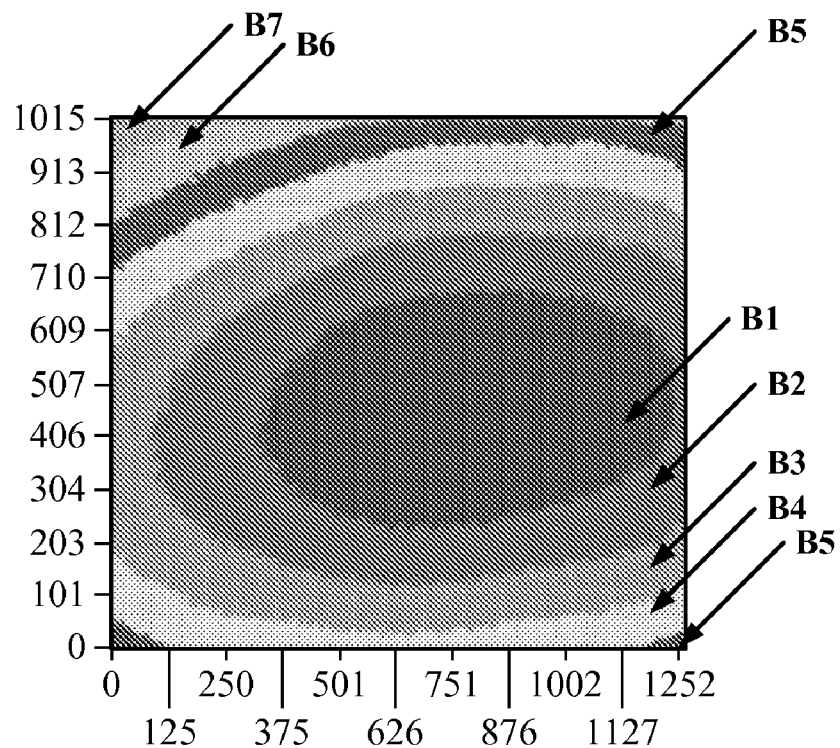
FIG. 1A shows a plot of conventional non-radial symmetric roll-off distortion from a first known lens.

The images in the drawings are simplified for illustrative purposes and are not depicted to scale. To facilitate understanding, identical reference numerals have been used, where possible, to designate identical elements that are common to the figures, except that suffixes may be added, when appropriate, to differentiate such elements.

The appended drawings illustrate exemplary configurations of the invention and, as such, should not be considered as limiting the scope of the invention that may admit to other equally effective configurations. It is contemplated that features or steps of one configuration may be beneficially incorporated in other configurations without further recitation.

DETAILED DESCRIPTION

The word "exemplary" is used herein to mean "serving as an example, instance, or illustration." Any configuration or design described herein as "exemplary" is not necessarily to be construed as preferred or advantageous over other configurations or designs.

Figure 1B:
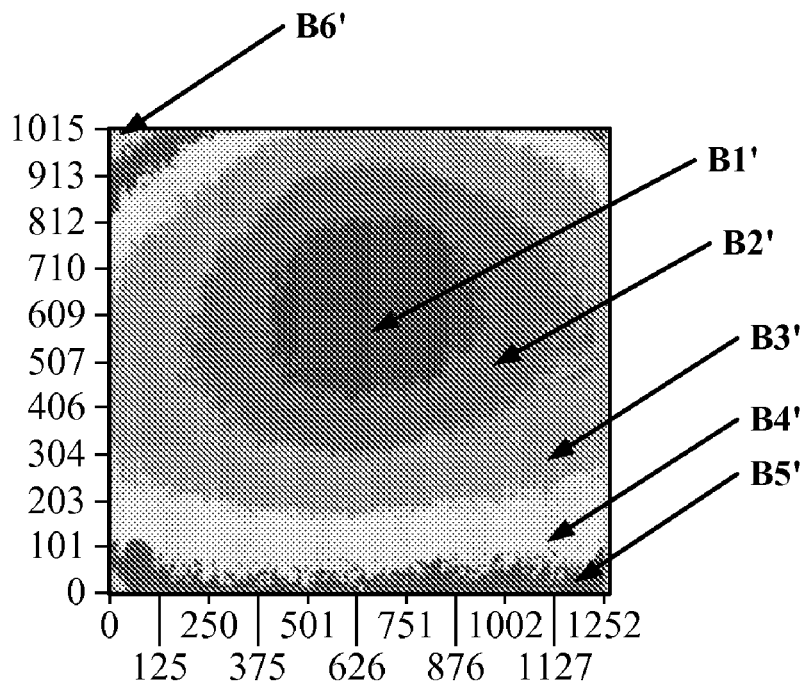
FIG. 1B shows a plot of conventional non-radial symmetric roll-off distortion from a second known lens.

FIG. 1A shows a plot 10A of conventional non-radial symmetric roll-off distortion from a first known lens. FIG. 1B shows a plot 10B of conventional non-radial symmetric rolloff distortion from a second known lens. The plots 10A and 10B are contour graphs to illustrate the rolloff pattern when taking a picture of a flat field image. In FIGS. 1A and 1B, a generally oval shaped distortion pattern is observed. Thus, the oval shaped distortion patterns violate the circular symmetry assumption of the radial-based lens roll-off correction method.

In FIG. 1A, the center oval contour, denoted as B1, has a brightness level between 156 and 140. This oval contour is encircled by a plurality of concentric oval-shaped rings of diminishing brightness. The center oval contour B1 represents a bright spot. The next (generally) concentric ring, denoted as B2, has a brightness level between 140 and 124. The next (generally) concentric ring, denoted as B3, has a brightness level between 124 and 108. The next (generally) concentric ring, denoted as B4, has a brightness level between 108 and 92. The next (generally) concentric ring, denoted as B5, has a brightness level between 92 and 76. The area, denoted as B6, would be the next (generally) concentric ring, after ring B5, and has a brightness level between 76 and 60. The area, denoted as B7, would be the next (generally) concentric ring, after ring B6, and has a brightness level between 60 and 44.

In FIG. 1B, the center contour, denoted as B1', is generally circular and has a brightness level between 142.70 and 129.40. This center circular contour is encircled by a plurality of concentric oval-shaped rings of diminishing brightness. The center contour B1' represents a bright spot. The next (generally) concentric ring, denoted as B2', has a brightness level between 129.40 and 116.10. The next (generally) concentric ring, denoted as B3', has a brightness level between 116.10 and 102.80. The next (generally) concentric ring, denoted as B4', after ring B3', has a brightness level between 102.80 and 89.50. The next (generally) concentric ring, denoted as B5', has a brightness level between 89.50 and 76.20. The area, denoted as B6', would be the next (generally) concentric ring, after ring B5', and has a brightness level between 76.20 and 62.90.

The techniques according to the invention described herein may be used for wireless communications, computing, personal electronics, etc. with a built-in camera module. An exemplary use of the techniques according to the invention for wireless communication is described below.

Figure 2:
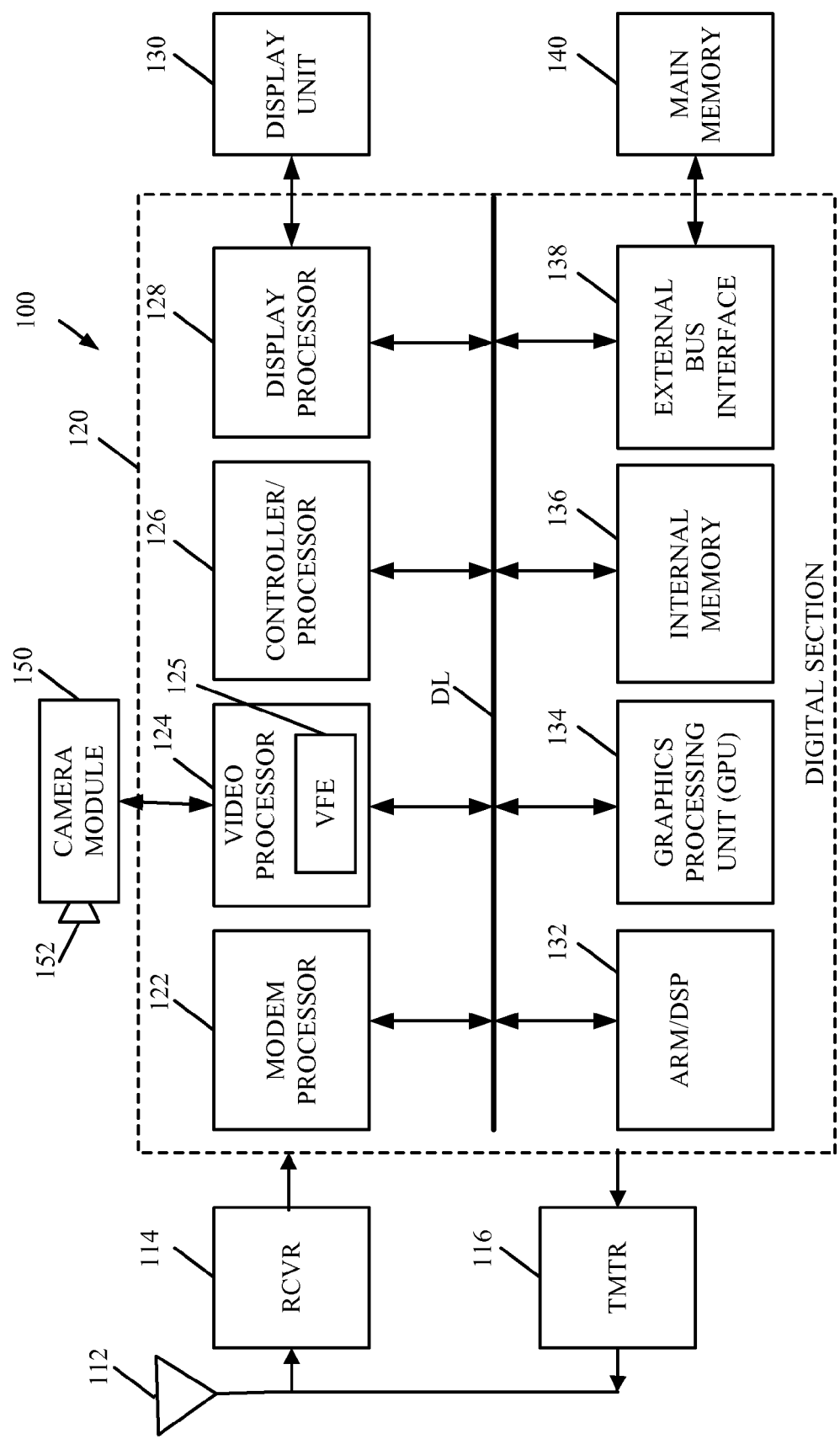
FIG. 2 shows a block diagram of a wireless device.

FIG. 2 shows a block diagram of a wireless device 100 for use in a wireless communication system. The wireless device 100 may be a cellular or camera phone, a terminal, a handset, a personal digital assistant (PDA), or some other device. The wireless communication system may be a Code Division Multiple Access (CDMA) system, a Global System for Mobile Communications (GSM) system, or some other system.

The wireless device 100 is capable of providing bi-directional communications via a receive path and a transmit path. On the receive path, signals transmitted by base stations are received by an antenna 112 and provided to a receiver (RCVR) 114. The receiver 114 conditions and digitizes the received signal and provides samples to a digital section 120 for further processing. On the transmit path, a transmitter (TMTR) 116 receives data to be transmitted from the digital section 120, processes and conditions the data, and generates a modulated signal, which is transmitted via the antenna 112 to the base stations.

The digital section 120 includes various processing, interface and memory units such as, for example, a modem processor 122, a video processor 124, a controller/processor 126, a display processor 128, an ARM/DSP 132, a graphics processing unit (GPU) 134, an internal memory 136, and an external bus interface (EBI) 138. The modem processor 122 performs processing for data transmission and reception (e.g., encoding, modulation, demodulation, and decoding). The video processor 124 performs processing on video content (e.g., still images, moving videos, and moving texts) for video applications such as camcorder, video playback, and video conferencing. The video processor 124 includes a video front end (VFE) 125. The VFE may be a MSM 8600 VFE. The video processor 124 performs processing for camera module 150 having a lens 152 to create still images and/or moving videos.

The controller/processor 126 may direct the operation of various processing and interface units within the digital section 120. The display processor 128 performs processing to facilitate the display of videos, graphics, and texts on a display unit 130. The ARM/DSP 132 may perform various types of processing for the wireless device 100. The graphics processing unit 134 performs graphics processing of a graphics pipeline.

The techniques according to the invention described herein may be used for any of the processors in the digital section 120, e.g., the video processor 124. The internal memory 136 stores data and/or instructions for various units within the digital section 120. The EBI 138 facilitates the transfer of data between the digital section 120 (e.g., internal memory 136) and a main memory 140 along a bus or data line DL.

The digital section 120 may be implemented with one or more DSPs, micro-processors, RISCs, etc. The digital section 120 may also be fabricated on one or more application specific integrated circuits (ASICs) or some other type of integrated circuits (ICs).

The techniques described herein may be implemented in various hardware units. For example, the techniques may be implemented in ASICs, DSPs, RISCs, ARMs, digital signal processing devices (DSPDs), programmable logic devices (PLDs), field programmable gate arrays (FPGAs), processors, controllers, micro-controllers, microprocessors, and other electronic units.

Figure 3:
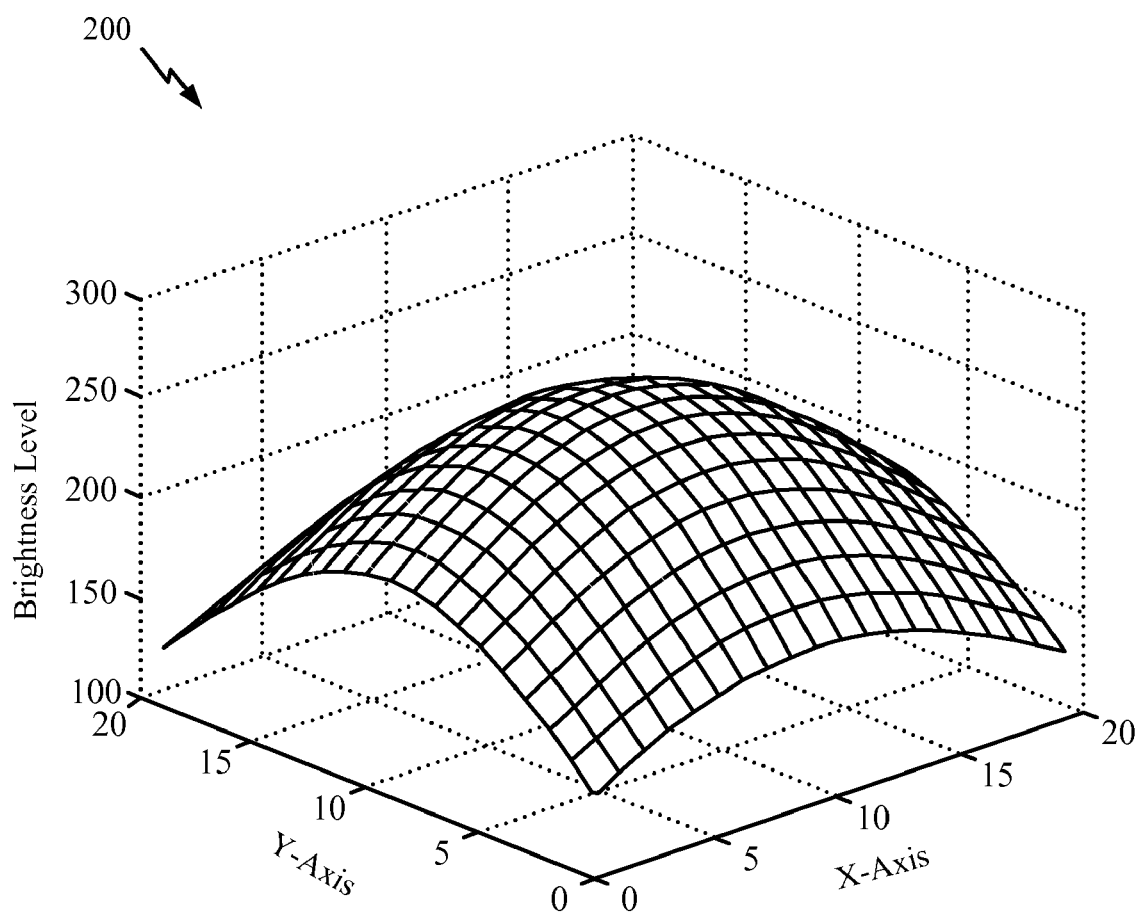
FIG. 3 shows a 2-dimensional mesh matching a lens roll-off surface.

FIG. 3 shows a 2-dimensional (2D) mesh 200 matching a lens roll-off surface. The 2D mesh 200 is applied over the surface of the distortion surface. The 2D mesh 200 is constructed and arranged to correct non-radially symmetric lens roll-off distortion and/or green channel distortion. The 2D mesh 200 is generated using the surface mesh matching process 300 described below. The surface mesh matching process 300 may be implemented in the VFE 125. The mesh 200 is shown as being curved such that there is a height variation. The vertical axis of FIG. 3 is the brightness level. The two (2) horizontal axes are the grid index for X and Y dimension of an image.

Figure 4A:
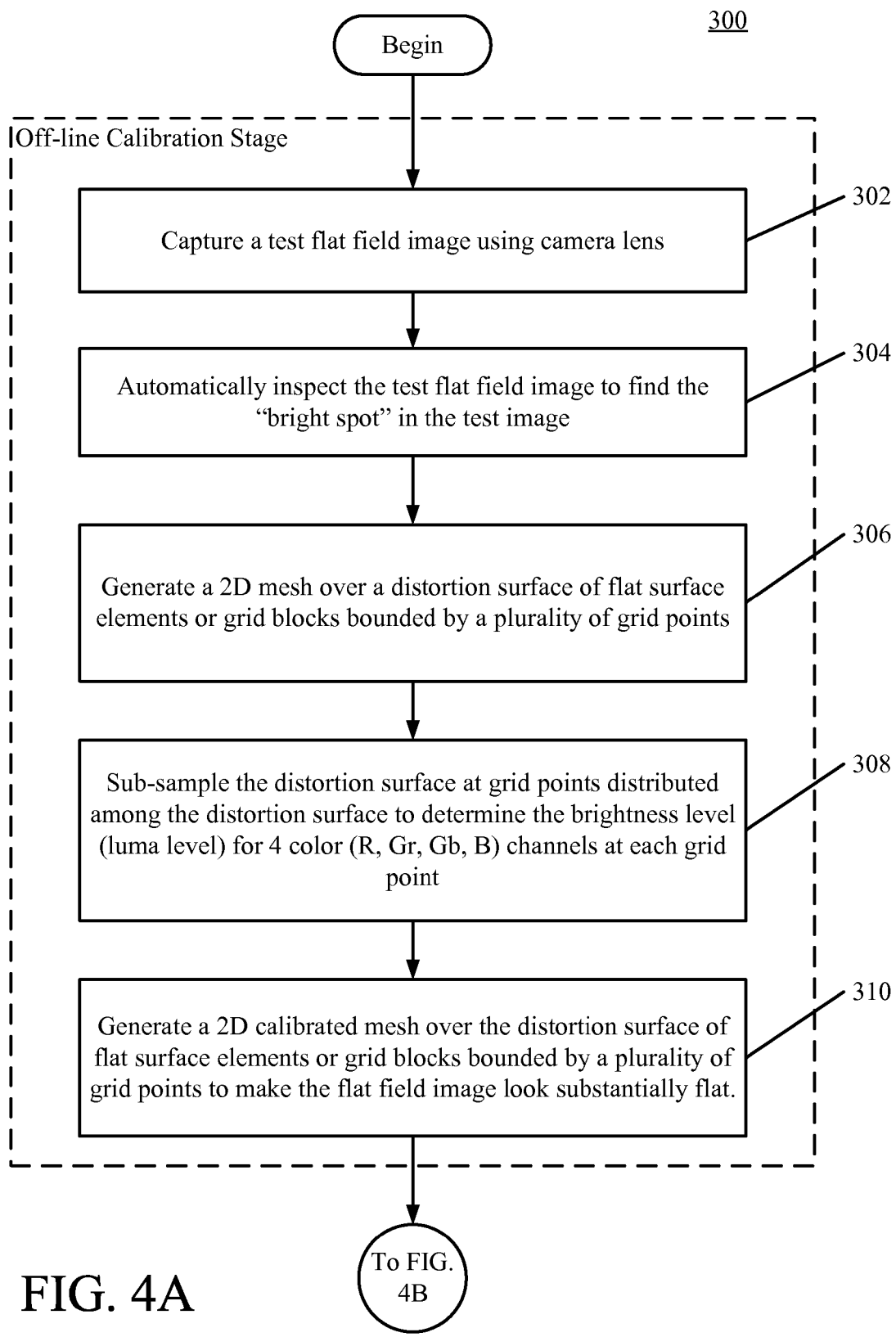
FIGS. 4A and 4B show a general flow diagram of a surface mesh matching process.
Figure 4B:
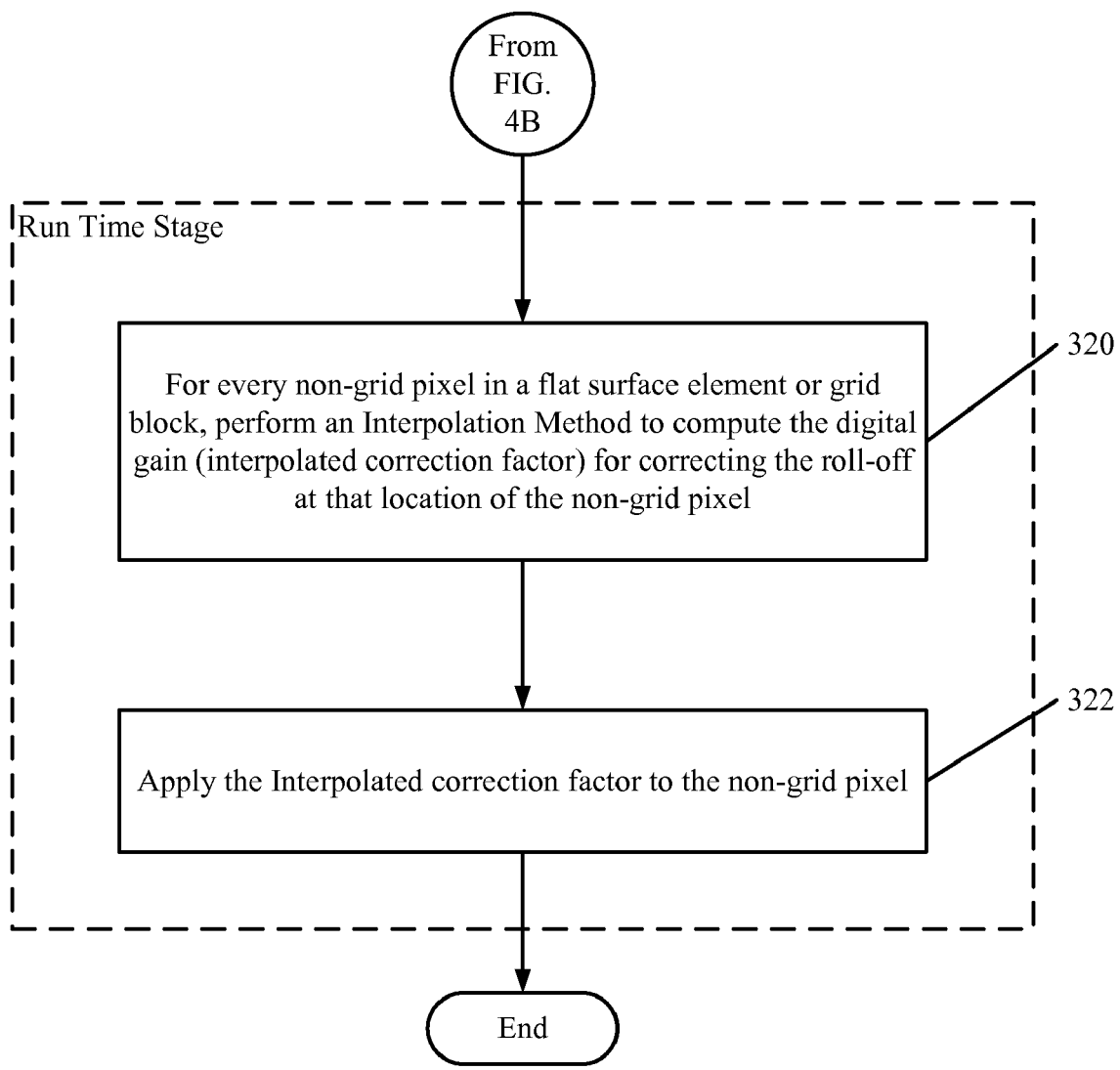

FIGS. 4A-4B show a general flow diagram of the surface mesh matching process 300. The surface mesh matching process 300 is designed to correct non-radial symmetric lens roll-off distortion and green channel imbalance. Moreover, the surface mesh matching process 300 is designed to correct radial symmetric lens roll-off distortion and/or green channel imbalance. As will be seen from the description below, the surface mesh matching process 300 is designed to universally correct roll-off distortion patterns.

In general, the surface mesh matching process 300 is arranged to perform lens rolloff correction in two stages. The first stage is an off-line calibration stage. Here, the user captures a flat field image. Theoretically, it should be flat. However, due to lens shading, a captured flat field image is not flat. The calibration stage inspects the whole flat field image and finds the "brightest spot". The brightness level at the brightest spot is used as a reference point. All other pixels have to apply a digital gain correction>1.0 in order to boost up their values to match the brightest spot. For example, in a case where the brightest spot has a luma level of 120 and at a certain grid point location a luma level of 80, the digital gain correction is 120/80=1.5 to correct the lens rolloff at that location.

At the end of the calibration stage, a grid map which gives clues of how much digital gain is needed at various locations of the captured flat field image in order to make the flat field image look completely flat is obtained. Once this set of digital gain correction tables are obtained, at run time, which is the second stage, the digital gain tables are used. At the run time stage, the digital gain correction is used to correct non-grid pixels (pixels of the image).

The details of the process 300 will now begin. In the Off-line Calibration stage, the process 300 begins at block 302 where a flat field image is captured using the camera 150 with lens 152. Block 302 is followed by block 304 where the image is inspected to find the "bright spot" or "brightest spot" therein. Block 304 is followed by block 306 where the 2D mesh is generated over the captured image (hereinafter sometimes referred to as a "distortion surface").

Figure 5A:
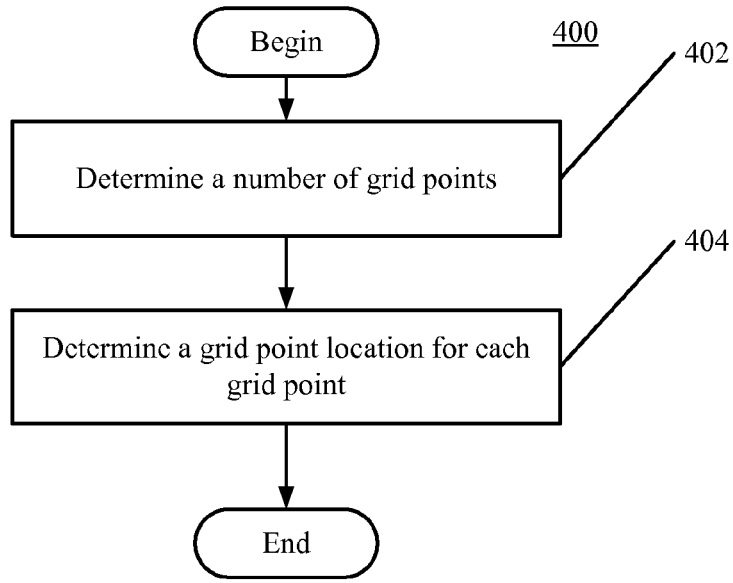
FIG. 5A shows a general flow diagram of a mesh generating process.

The mesh generating process 400 is described in more detail in relation to FIG. 5A. The 2D mesh has a plurality of grid points to create a plurality of small flat surface elements or grid blocks 700 (FIG. 6), as will be described later. In the exemplary embodiment, each flat surface element or grid block 700 is defined by a grid point at each corner. The small flat surface elements or grid blocks 700 are used to approximate the curved roll-off surface.

Block 306 is followed by block 308 where the distortion surface is sub-sampled at the grid points distributed among the distortion surface to determine a brightness level for at least one color channel. Generally four channels are evaluated including the red channel, the green 1 (Gr) channel, the green 2 (Gb) channel and the blue (B) channel. The details for the distortion pattern subsampling process are described in more detail in relation to FIG. 5B.

The distortion surface can be sub-sampled by the grid points evenly distributed among the entire distortion surface. The number of grid points that are needed in order to provide good approximation (no visual artifact) to the distortion surface depends on the smoothness of the surface. The factor such as memory space consideration also comes into play to determine the number of grid points. In a software implementation, non-uniformly distributed grid points can be used, but it is recommended to apply evenly distributed grid points for hardware implementation.

Block 308 is followed by block 310 where a 2D calibrated mesh over the distortion surface is generated wherein the 2D calibrated mesh includes the 2D mesh of FIG. 3 with the mesh look-up-tables LUT (FIG. 8A or 8B) having digital gain correction values for the grid points. These digital gain correction values calibrate the 2D mesh so that the distortion surface appears substantially flat. The process for determining the mesh's digital gain correction values will be described later in relation to FIG. 5C.

Block 310 is the last block of the off-line calibration stage. The off-line calibration stage is followed by the run time stage which begins with block 320. At block 320, between the grid points of a respective one flat surface element or grid block 700, an Interpolation Method is performed to approximate the distortion curve surface (lens roll-off distortion) for at least one non-grid pixel, as will be described in more detail in relation to FIGS. 7A and 7B. At block 320, an interpolated correction factor (ICF) is determined for the non-grid pixel (NGP). At block 322, the interpolated correction factor (ICF) is applied to the NGP to correct the lens roll-off distortion.

FIG. 5A shows a general flow diagram of a mesh generating process 400. The mesh generating process 400 begins at block 402 where a number of grid points is determined. Block 402 is followed by block 404 where the grid point and its location are determined. The grid points may be evenly distributed or randomly distributed.

Figure 5B:
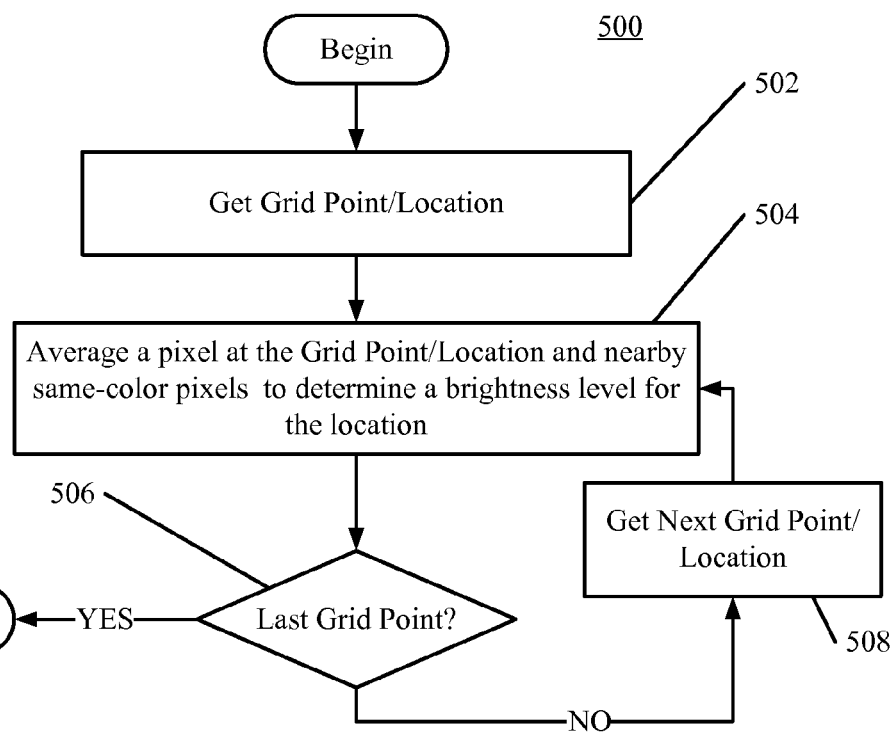
FIG. 5B shows a distortion pattern subsampling process.

FIG. 5B shows a distortion pattern subsampling process 500. After the number of grid points and their location have been determined above in process 400, a grid point and location is obtained at block 502 for sub-sampling. At block 504, a pixel in the distortion surface at the grid location and the geographically nearby same-color pixels in the distortion surface are averaged to determine the brightness level (luma level) at the grid location. This is done to smooth out the influence of noise. Thus, each grid point is provided with a brightness level. If there are four color channels, this block 504 may be performed for each color channel. Nevertheless, the brightness level may be calculated in other ways such as without averaging.

Block 504 is followed by block 506 where a determination is made whether it is the last grid point. If the determination is "YES," the process 500 ends. However, if the determination is "NO," the next grid point is obtained at block 508 which returns to block 504.

Figure 5C:
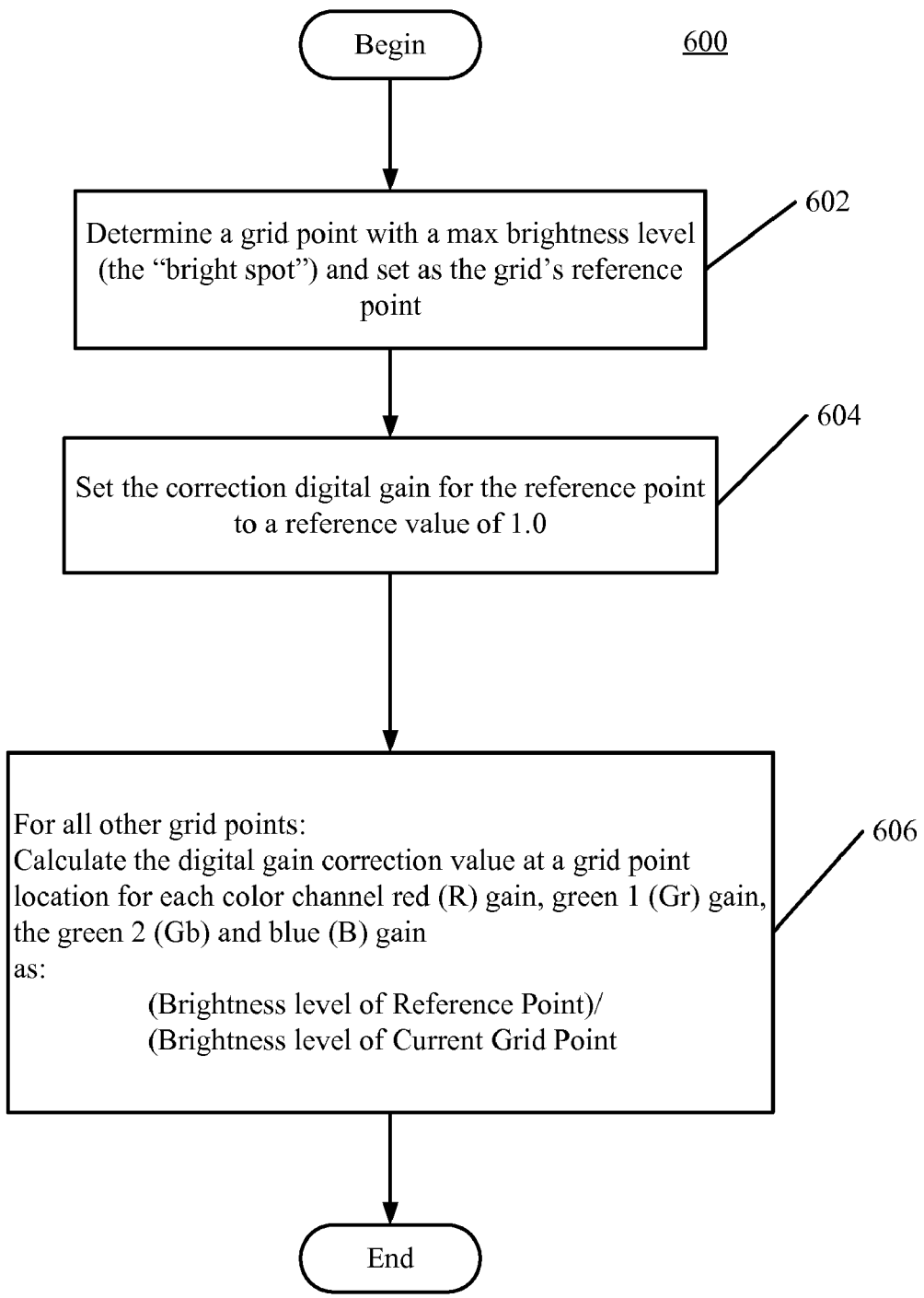
FIG. 5C shows a mesh digital gain correction process.

FIG. 5C shows a mesh digital gain correction process 600. The process 600 begins with block 602 where for each color channel, the grid point with the maximum brightness level is the "bright spot" and is set as the reference point. The digital gain correction value for the reference point is set to a reference value of 1.0 at block 604. In other words, if the reference brightness level is 120, the digital correction value is 120/120.

At block 606, at all other grid points, the digital gain correction value is determined by taking a ratio of the brightness level of the reference point to the brightness level of the current grid point. Thus the ratio is equal to (brightness level of the reference point)/(brightness level of the current grid point). For example, if the current grid point has a brightness level of 80, the ratio is 120/80 which equals 1.5.

Figure 8A:
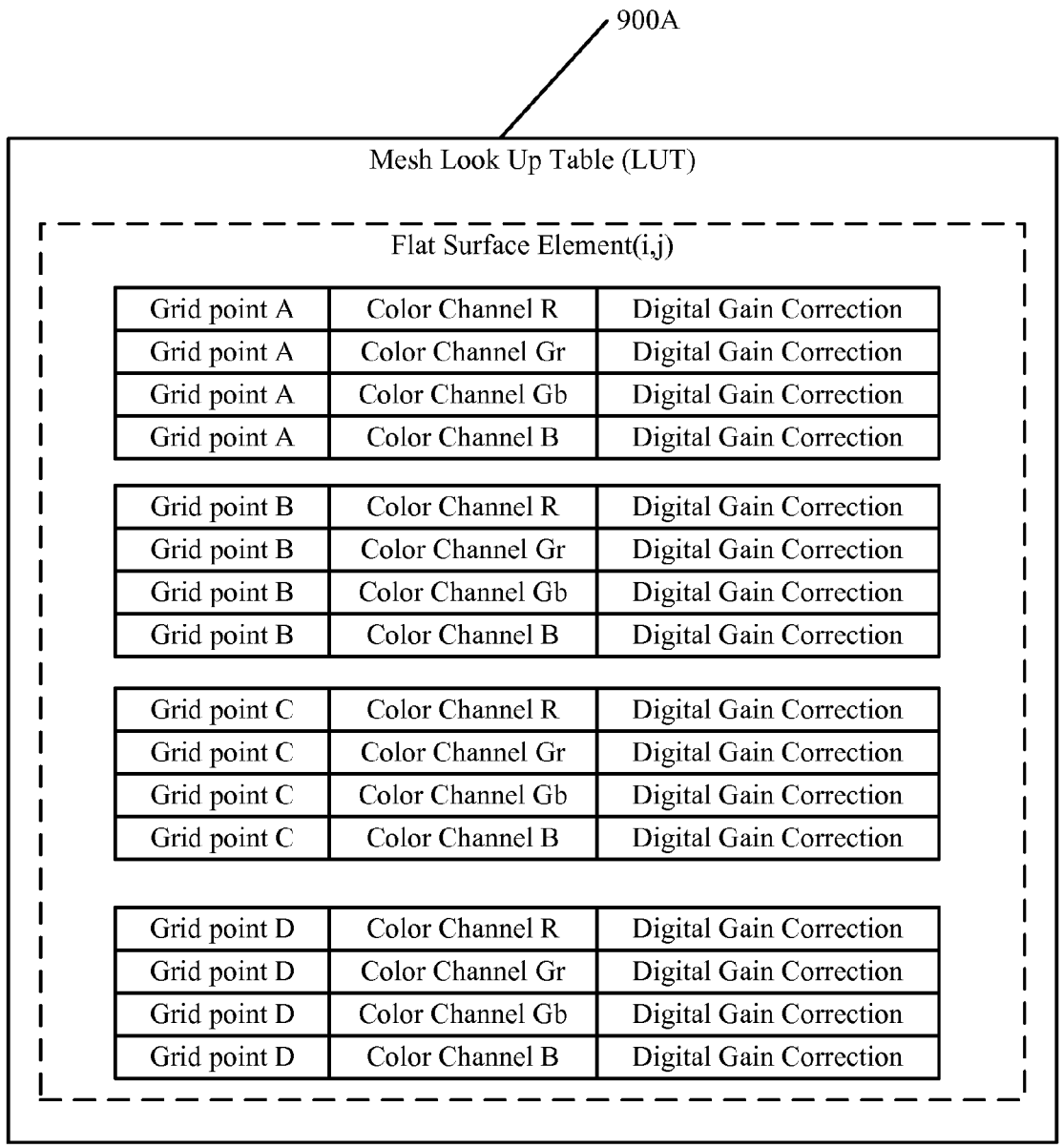
FIG. 8A shows a partial view of a mesh LUT for general image types.

In the end, at each grid point location there are four (4) digital gain correction values associated with the location (See FIG. 8A). The four (4) digital gains include: red gain, green1 (Gr) gain, green2 (Gb) gain and blue gain. A new "bright spot" grid point is calculated for each color channel. Thus, the reference point for any one color channel may differ with other color channels.

Figure 6:
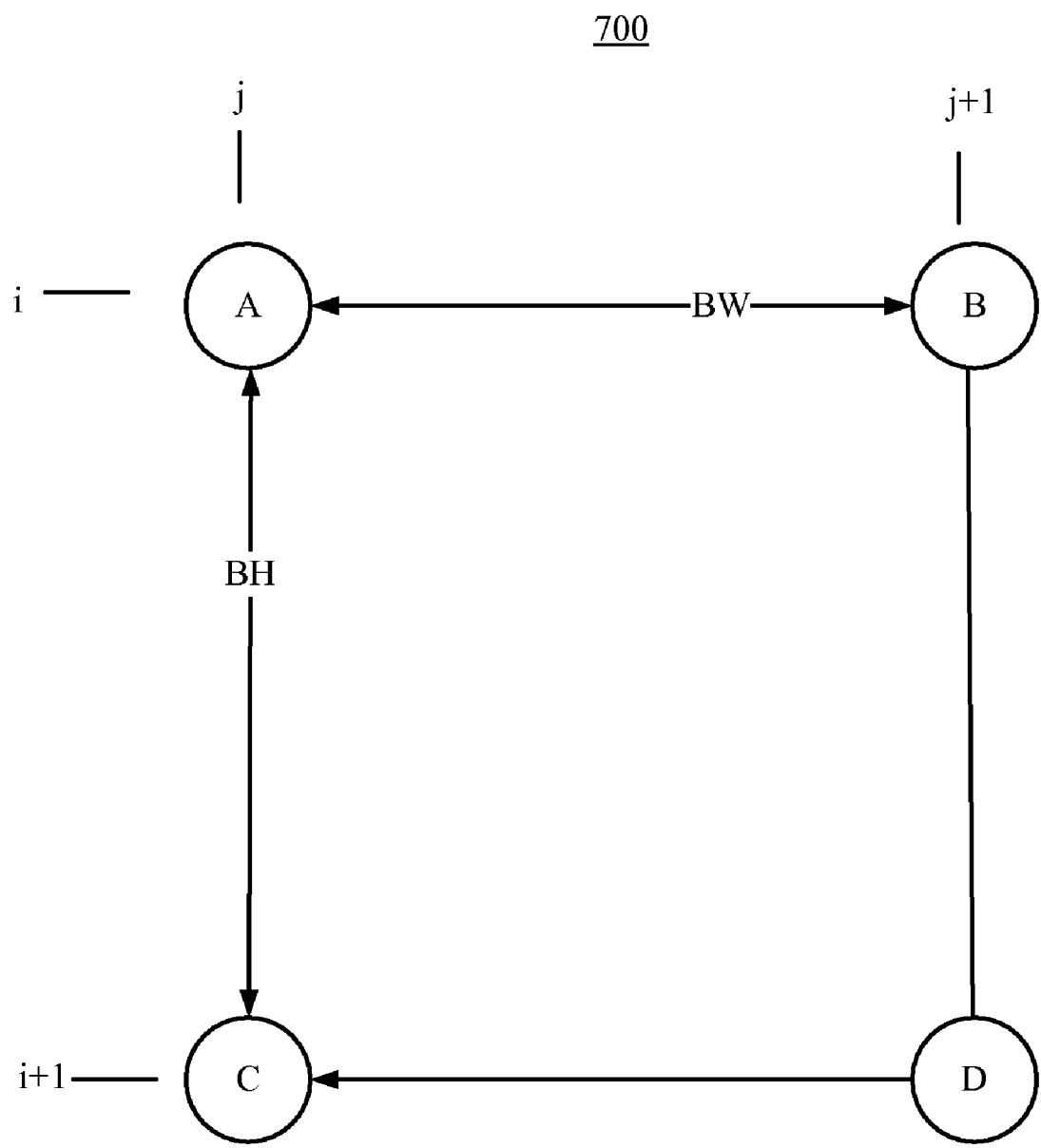
FIG. 6 shows a grid block or a flat surface element of the 2D mesh.

FIG. 6 shows a grid block or a flat surface element 700 of the 2D mesh 200. Each circle A, B, C and D denotes a grid point. Thus, each grid block or flat surface element 700 has a set of four grid blocks. Accordingly, adjoining grid blocks or flat surface elements in the 2D mesh 200 share the grid points. In the grid block or flat surface element 700, the distance or block_width between the grid points A and B or C and D in the horizontal plane is denoted as BW. Furthermore, the distance or block_height between the grid points A and C or B and D in the vertical plane is denoted as BH. The block_width BW may not be equal to the block_height BH. The grid point A has an index of (i,j), grid point B an index of (i,j+1), grid point C an index of (i+1,j), and grid point D an index of (i+1,j+1).

Figure 7A:
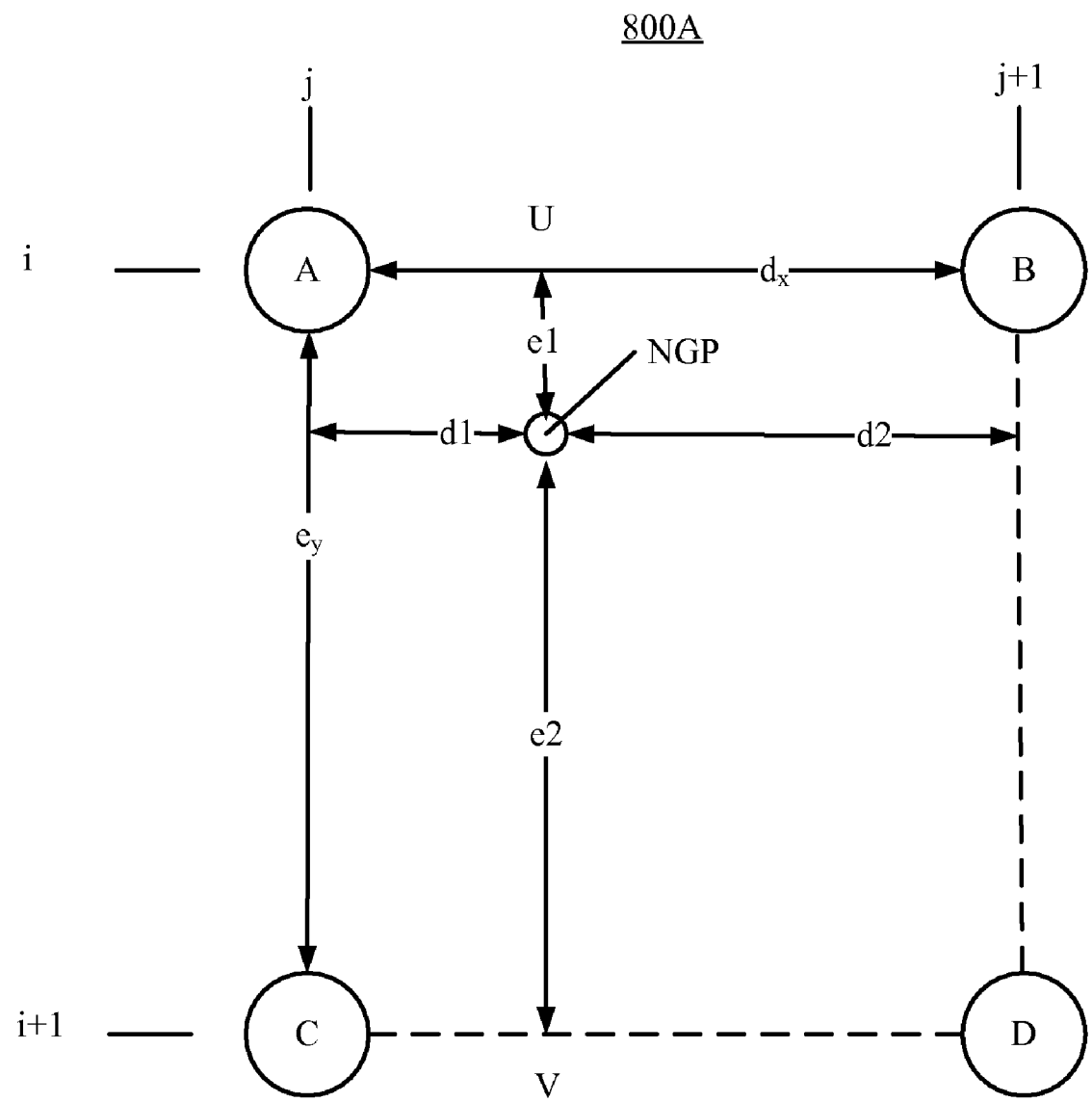
FIG. 7A shows a grid block or flat surface element of the 2D mesh for bilinear interpolation of a pixel.

FIG. 7A shows a grid block or flat surface element 800A of the 2D mesh for bilinear interpolation of a pixel of the distortion surface (hereinafter referred to as a "non-grid pixel"). Every non-grid pixel (NGP) is bounded by 4 grid points A, B, C and D, which form the grid block or flat surface element of the 2D mesh 200. The grid point A has a grid location (i,j). The grid point B has a grid location (i,j+1). The grid point C has a grid location (i+1,j). The grid point D has a grid location (i+1,j+1). The 2D mesh 200 has M×N grid blocks or flat surface elements.

In the exemplary configuration, a bilinear interpolation method is used to compute the digital gain for correcting the roll-off at the location of the non-grid pixel (NGP). In order to reduce the computation complexity, the BW and BH distances among grid points are a power of 2; therefore, the normalization can be done using right shift operation. The other way to simplify the computation is to use an accumulator which takes advantage of the raster scanning order of images. In other words, the multiplications, described below, are replaced by an iterative summation. For example, y[n−1]= a+slope*delta_x; and y[n]=a+slope*(delta_x+1). Thereafter, obtain the value y[n+1]=y[n]+slope.) For the latter method, the BW and BH distances are not limited to the power of 2. Delta gains are used instead of the digital gains for each grid point, as will be described later.

In the configuration of FIG. 7A, the BW between horizontal grid points is denoted as $d_x$ and the BH between the vertical grid points is denoted as $e_y$ which are defined in equations Eq. (1) and Eq. (2) as $$d_x = 2^M \quad \text{Eq. (1); and}$$

$$e_y = 2^N \quad \text{Eq. (2)}$$

where M is the number of grid blocks in the horizontal plane distributed along the 2D mesh 200; and N is the number of grid blocks in the vertical plane distributed along the 2D mesh 200.

Then the distances from the horizontal planes i and i+1 and the vertical planes j and j+1 to the NGP are determined or calculated. The vertical distance e1 is calculated from the NGP to the upper horizontal plane i. The vertical distance e2 is calculated from the NGP to the lower horizontal plane i+1 and is defined by equation Eq. (3)

$$e2 = e_y - e1. \quad \text{Eq. (3)}$$

The horizontal distance d1 is calculated from the NGP to the left or leading vertical plane j. The distance d2 is calculated from the right or trailing vertical plane j+1 and is defined by equation Eq. (4)

$$d2 = d_x - d1 \quad \text{Eq. (4)}$$

where d1 and e1 are determined based on the location of at least the grid point A to the NGP.

A set of bilinear interpolation factors U and V are then calculated as defined by the equations Eq. (5) and Eq. (6)

$$U = (d2*a + d1*b) >> M; \quad \text{Eq. (5)}$$

or $$U = (d2*a + d1*b)/2^M; \text{ and}$$

$$V = (d2*c + d1*d) >> M \quad \text{Eq. (6)}$$

or $$V = (d2*c + d1*d)/2^M$$

where the values a, b, c and d are the digital gain correction values for the grid points A, B, C and D, respectively; the symbol ">>M" represents a bitwise right shift and is evaluated as $\div 2^M$. These values may be stored in a mesh LUT 900A, as best seen in FIG. 8A. For some images there are four color channels with four digital gains: red (R) color channel, green1 (Gr) color channel, green2 (Gb) color channel, and a blue (B) color channel. Thus, there are four sets of U and V bilinear interpolation factors.

The set of bilinear interpolation factors U and V are used to calculate an interpolated correction factor (ICF) as defined by equation Eq. (7).

$$ICF = (U*e2 + V*e1) >> N \quad \text{Eq. (7)}$$

or $$ICF = (U*e2 + V*e1)/2^N$$

The interpolated correction factor (ICF) for each color channel is applied to the NGP to correct the lens roll-off at the NGP's location. The ICF is the final digital gain to be multiplied to a pixel.

It is also found out that it is more advantageous to use more grid points than to use a complicated interpolation method (e.g., bi-cubic interpolation). For example, the approximation error for 16×16 grids with bi-linear interpolation is better than 8×8 grids with bi-cubic interpolation. For hardware implementation, the bilinear interpolation method may be a preferred candidate for use in the VFE 125.

For the implementation shown in FIG. 6, each NGP requires 6 multiplications, 3 additions, 2 subtractions and 3 right shifts to compute the ICF for one color channel. A Bayer raw image has only one color channel. Hence, if the bilinear interpolation method is applied on the Bayer raw image, the calculations to calculate the ICF are performed only once for the NGP.

Figure 8B:
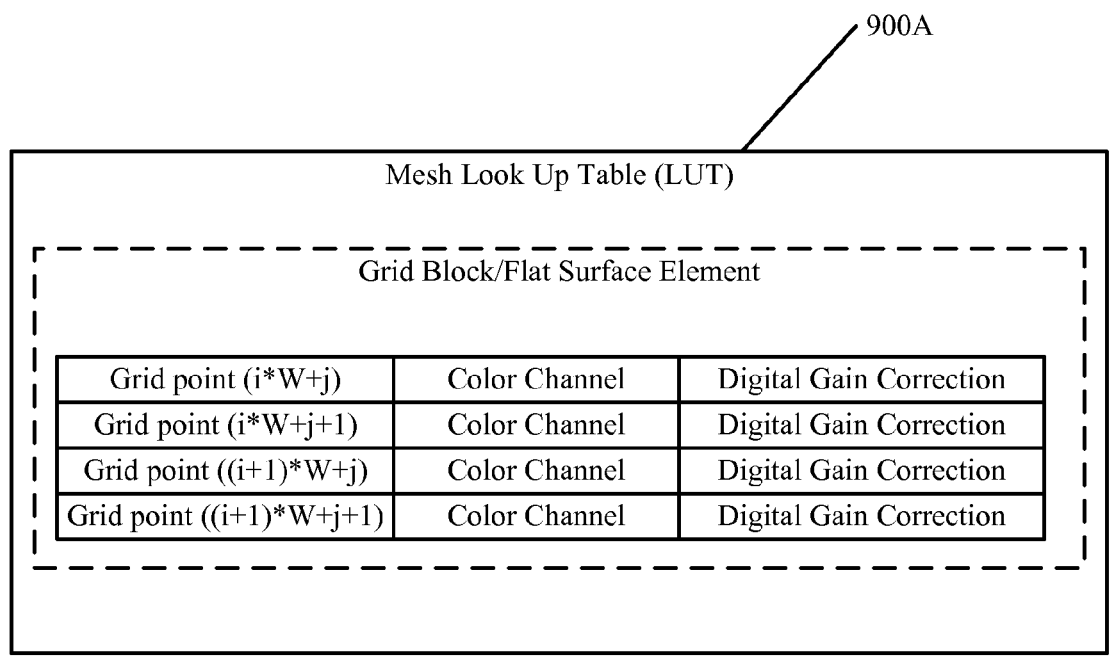
FIG. 8B shows a partial view of a mesh LUT for use with a Bayer raw image or hardware implementation.

For a Bayer raw image, to calculate the ICF for a NGP only four values need to be looked-up in a mesh LUT 900B, as best seen in FIG. 8B (that is, the correction factor or digital gain correction values for the grid points that bound this NGP).

Figure 7B:
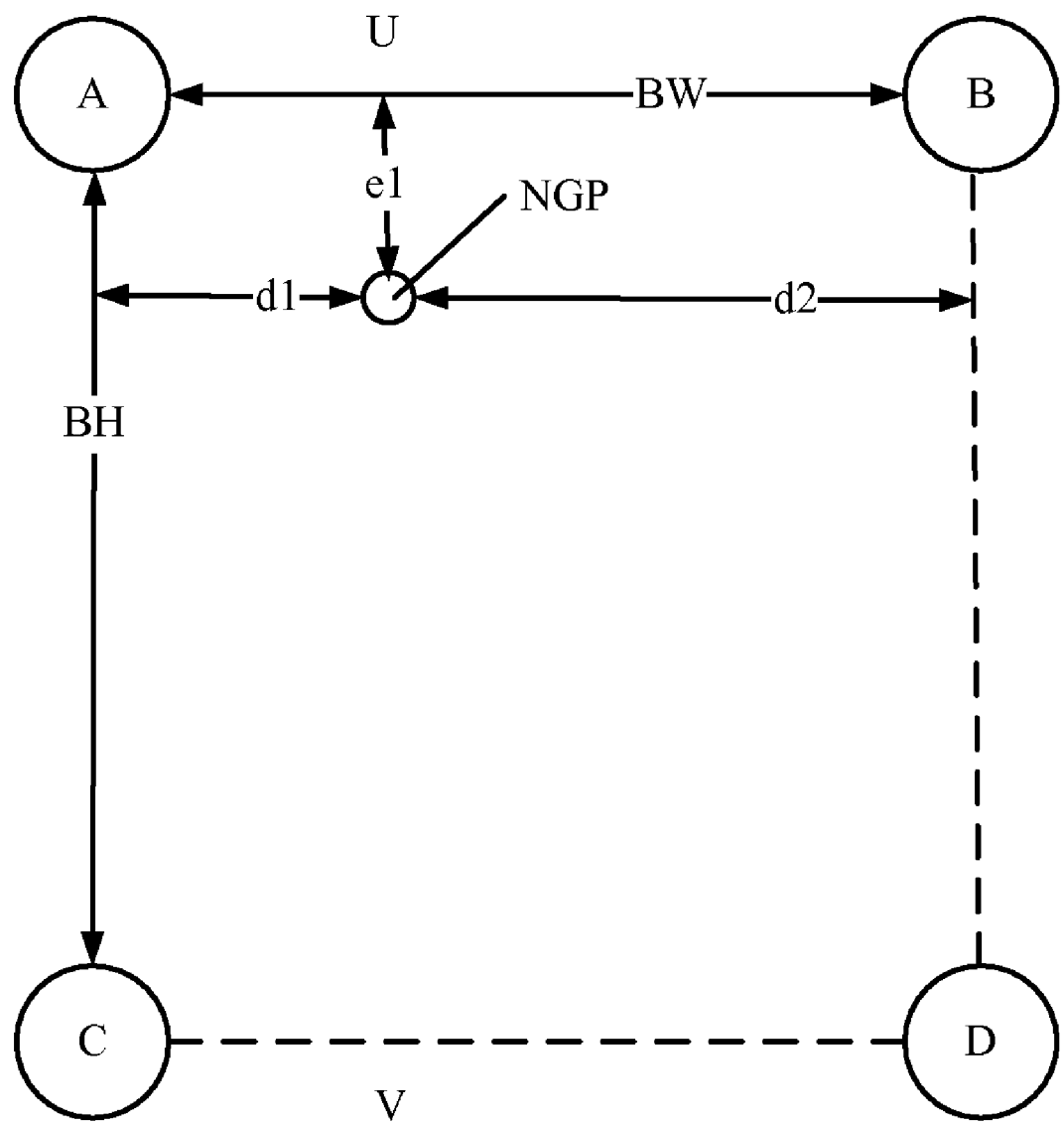
FIG. 7B shows a grid block or a flat surface element of the 2D mesh for bilinear interpolation of a pixel using hardware implementation.

FIG. 7B shows a grid block or a flat surface element 800B of the 2D mesh for bilinear interpolation of a pixel. The 2D mesh 200 has M×N grids. The bilinear interpolation described below is also suitable for hardware implementation. Assume that there are a total of W grids in the horizontal plane or direction. The horizontal index j can be computed by equation Eq. (8)

$$j = x >> M; \quad \text{Eq. (8)}$$

or $$j = x/2^M; \text{ and}$$

the vertical index i is obtained by equation Eq. (9)

$$i = y >> n. \quad \text{Eq. (9)}$$

or $$i = y/2^N.$$

The digital gain correction values a, b, c and d are defined in equations Eq. (10), Eq. (11), Eq. (12) and Eq. (13), respectively $$a = LUT[i*W + j], \quad \text{Eq. (10)}$$

$$b = LUT[i*W + j + 1], \quad \text{Eq. (11)}$$

$$c = LUT[(i+1)*W + j] \text{ and} \quad \text{Eq. (12)}$$

$$d = LUT[(i+1)*W + j + 1]. \quad \text{Eq. (13)}$$

where LUT[ ] is a location in a mesh lookup table 900B having associated therewith a digital gain correction value a, b, c or d.

A set of bilinear interpolation factors U and V are then calculated as defined by the equations Eq. (14) and Eq. (15)

$$U = a + d1*(b-a)/BW \quad \text{Eq. (14)}$$

$$V = c + d1*(d-c)/BW \quad \text{Eq. (15)}$$

where the values a, b, c and d are the digital gain correction values for the grid points A, B, C and D, respectively, of the grid block; and BW is the distance between grid points A and B or C and D. The grid points ABCD forms a rectangle.

These digital gain correction values may be stored in a mesh LUT 900A, as best seen in FIG. 8A. Other information such as distances may also be stored in the LUT 900A.

The set of bilinear interpolation factors U and V are used to calculate an interpolated correction factor (ICF) as defined by equation Eq. (16)

$$ICF = U + (V-U)*e1/BH \quad \text{Eq. (16)}$$

where BH is the vertical distance between grid points A and C; d1 is a distance calculated from the NGP to the left or leading vertical plane i; and e1 is the distance calculated from the NGP to the upper horizontal plane j. The interpolated correction factor (ICF) for the channel is applied to the NGP to correct the lens roll-off at the NGP's location.

The process for using Delta gains will now be described. The derivation for using Delta gains from the bilinear interpolation U factor is shown in equations Eq. (17), Eq. (18) and Eq. (19) as follows:

$$U = (d2*a + d1*b) >> M \quad \text{Eq. (17)}$$
$$= a + delta1*d1 \quad \text{Eq. (18)}$$
$$= a + \text{accumulate}(Delta\_Table[Yblock, Xblock]) \quad \text{Eq. (19)}$$

The derivation for using Delta gains from the bilinear interpolation V factor is shown in equations Eq. (20), Eq. (21) and Eq. (22) as follows:

$$V = (d2*c + d1*d) >> M \quad \text{Eq. (20)}$$
$$= c + delta2*d1 \quad \text{Eq. (21)}$$
$$= c + \text{accumulate}(Delta\_Table[Yblock+1, Xblock]) \quad \text{Eq. (22)}$$

The derivation for using Delta gains from the ICF is shown in equations Eq. (23), Eq. (24) and Eq. (25) as follows:

$$\text{Interpolated correction factor} (ICF) = (u*e2 + v*e1) >> N \quad \text{Eq. (23)}$$
$$= U + (V-U)*e1/BH \quad \text{Eq. (24)}$$
$$= U + (V-U)*\text{accumulated}(Delta\_Height) \quad \text{Eq. (25)}$$

where Delta_Height equals 1/block_height; and accumulate (Delta_Height) is function for calculating a summation of N Delta_Heights. Instead of using the multiplication operation, the summation operation can save hardware size. For example, N*Delta_Height can be replaced by Delta_Height+ Delta_Height+ . . . +Delta_Height (summation of N times). When the next row is processed, the Delta_Height is accumulated, instead of multiplying row index with the Delta_ Height.

The lens roll off correction gain is derived for each pixel in order in a hardware (HW) implementation. Therefore the multiplication in the derivation of the bilinear interpolation U and V factors could be replaced by iterative summation or the accumulation. Delta_Table[Yblock, Xblock] represents the correction factor (CF) change slope on the top boundary edge of the block index (Yblock, Xblock). The top boundary edge is the horizontal line between two grid points, such as, from the grid point A to grid point B. The delta_table[Yblock, Xblock] can be computed as equation Eq. (26)

$$\text{delta\_table}[Yblock, Xblock] = \left( \frac{CF[Yblock, Xblock+1] - CF[Yblock, Xblock]}{\text{Block\_width}} \right) \quad \text{Eq. (26)}$$

where the block index (Yblock, Xblock) is the current block; and the block index (Yblock, Xblock+1) is the next block in the X or horizontal direction. It is derived to obtain the minimum mean square error (MMSE) for a flat reference image.

When the image sensor pixel count increases, the photo diode size shrinks in order to maintain a reasonable die size. Due to the pixel downsizing, the green channel imbalance becomes a serious issue. With the mesh based lens roll-off method and with 4-channel correction, this imbalance artifact (cross hatch artifact) can be reduced

RESULTS

Figure 9:
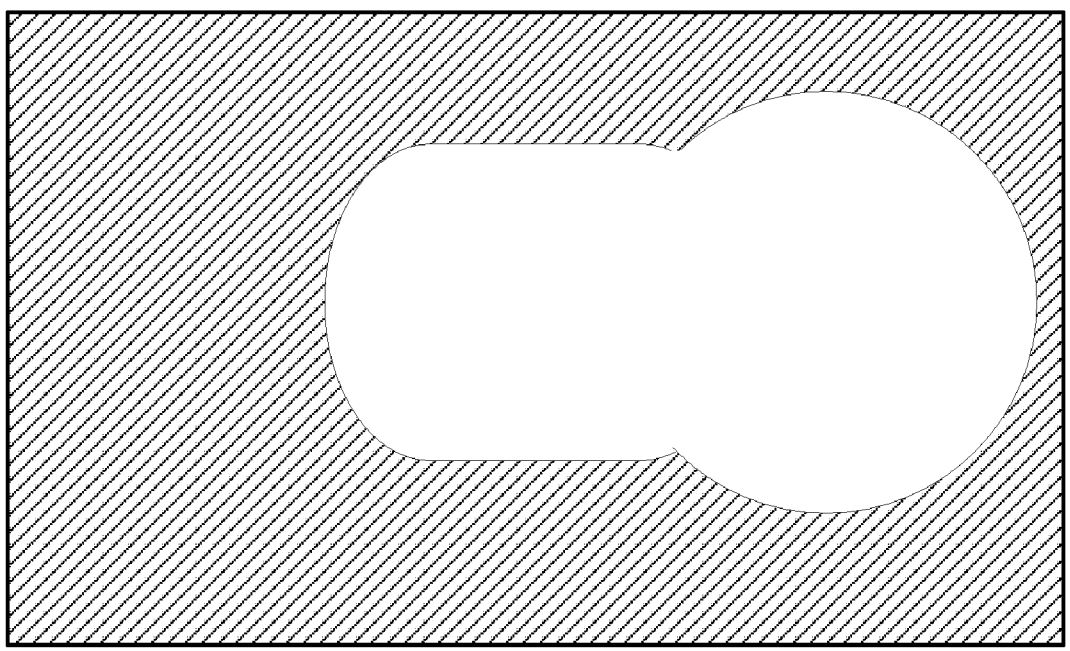
FIG. 9 shows a conventional flat field image with non-circular symmetric roll-off distortion.

FIG. 9 shows a conventional flat field image with non-circular symmetric roll-off distortion. In FIG. 9, the conventional flat field image 1010 (1280×1024) with non-radial roll-off distortion is used for testing the surface mesh matching process 300. This flat field image 1010 has both a lens roll-off that is not radial symmetric and a bright spot (roll-off center) which is skewed to the right. Applying the radial-based roll-off correction method based on radial symmetry assumption did not effectively correct the lens roll-off.

Figure 10:
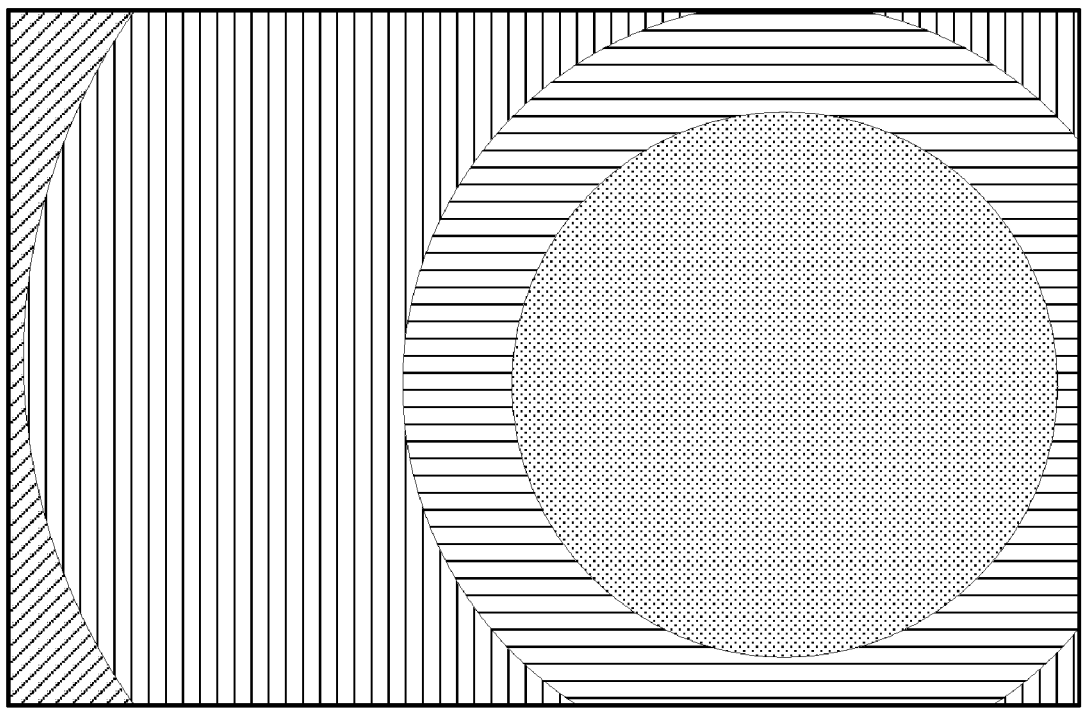
FIG. 10 shows a flat field image of FIG. 9 corrected by a conventional radial-based lens roll-off correction method based on radial symmetry assumption with a LUT size=224.

FIG. 10 shows the flat field image 1020 of FIG. 9 corrected by a conventional radial-based lens roll-off correction method based on radial symmetry assumption with a LUT size=224. Visual inspection of the flat field image 1020 still shows bright spots and lens roll-off or other distortions. This is expected because the basic assumption of radial symmetry is not met. The flat field image 1020 has circular distortions patterns with concentric rings having varying brightness levels represented by different shading.

Figure 11:
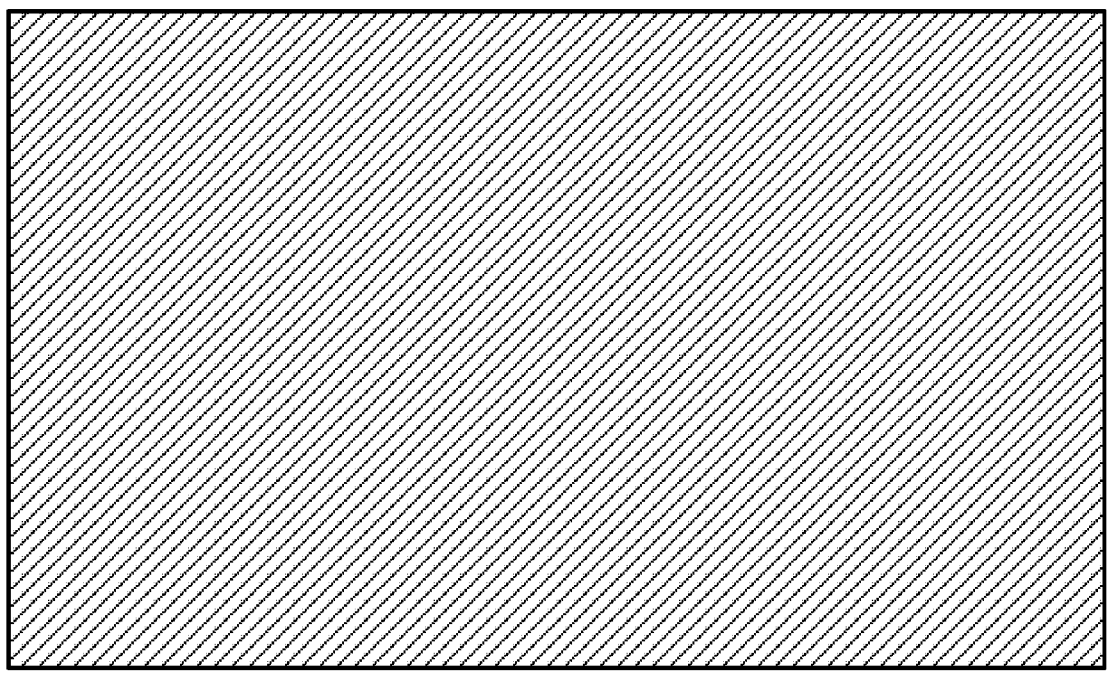
FIG. 11 shows a flat field image of FIG. 9 corrected by a surface mesh matching process.

FIG. 11 shows the flat field image 1030 of FIG. 9 corrected by a surface mesh matching process 300. When applying the surface mesh matching process 300, the results are much better at the cost of increased memory cost (larger LUT size) and reduced logic cost (simpler computation than radial based method). The bright spots are not present and the roll-off is corrected. The flat field image 1030 is generally uniform in color and brightness and is a better representation of a flat field image.

For an image with near radial symmetric lens roll-off distortion, the surface mesh matching process 300 performs about the same as the conventional method (based on a radial symmetric assumption). The brightness uniformity after correction is relatively close.

In some cases, the original flat field image prior to correction has a directional color shift. A color shift still exists after correction by the conventional radial-based lens roll-off correction method, but the surface mesh matching process 300 generates a very flat and uniform surface. Thus, the surface mesh matching process 300 also corrects for color shifts.

Due to the green channel imbalance, cross hatch artifacts show up after demosaic processing. A comparison of the correction with the surface mesh matching process 300 with 4 color channels to the original image or an image corrected with the conventional radial-based lens roll-off correction method shows that the process 300 can reduce the severity of the cross hatch artifact.

In summary, the surface mesh matching process 300 can correct for non-symmetric types of distortion and radial symmetric lens roll-off distortion. Thus, the distortion patterns which can be corrected may be directional or asymmetric of any shape. For example, the distortion pattern may be oval, radially symmetric, kidney-shaped, etc. With 4-channel correction, the cross hatch artifact caused by the green channel imbalance may be reduced.

In one or more exemplary configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed configurations is provided to enable any person skilled in the art to make or use the disclosure. Various modifications to these configurations will be readily apparent to those skilled in the art, and the generic principles defined herein may be applied to other configurations without departing from the spirit or scope of the disclosure. Thus, the disclosure is not intended to be limited to the configurations shown herein but is to be accorded the widest scope consistent with the principles and novel features disclosed herein.

What is claimed is:

1. An apparatus comprising:
a processing unit to implement a set of operations to apply a two-dimensional (2D) mesh with a plurality of grid blocks over a distortion surface to approximate a lens roll-off distortion, and to adjust non-grid pixels (NGPs) in the distortion surface underlying a corresponding grid block based on the approximation for the corresponding grid block to correct for the lens roll-off distortion, wherein the lens roll-off distortion comprises the distortion of a lens' curvature; and
a memory coupled to the processing unit.

2. The apparatus of claim 1, wherein the set of operations which apply the 2D mesh includes a subset of operations to distribute a plurality of grid points among the distortion surface and determine a digital gain correction value to boost a brightness level for each grid point to a brightness level of a bright spot in the distortion surface, each grid block having a set of four grid points (A,B,C and D) located at each corner of the grid block so that adjacent grid blocks share a pair of grid points.

3. The apparatus of claim 2, wherein the set of operations to adjust includes a subset of operations to approximate the lens roll-off distortion of any one pixel in the distortion surface between the set of grid points.

4. The apparatus of claim 3, wherein the subset of operations to approximate include a subset of operations to perform bilinear interpolation to calculate a set of interpolation factors (U,V) and an interpolated correction factor (ICF) for a respective one non-grid pixel (NGP) in the corresponding grid block defined by $$U=(d2*a+d1*b)/2^M;$$

$$V=(d2*c+d1*d)/2^M; \text{ and}$$

$$ICF=(U*e2+V*e1)/2^N$$

where $$d2=d1-2^M$$

$$e2=e1-2^N$$

and where M is the number of grid points in a horizontal direction of the 2D mesh; N is the number of grid points in a vertical direction of the 2D mesh; $2^m$ is a distance between horizontally aligned grid points A and B and grid points C and D of the corresponding grid block; $2^n$ is a distance between vertically aligned grid points A and C and grid points B and D of the corresponding grid block; e1 is a distance calculated from a NGP to an upper horizontal plane, of the corresponding grid block, having the horizontally aligned grid points A and B; d1 is calculated from a location of the NGP to a leading vertical plane, of the corresponding grid block, having the vertically aligned grid points A and C; and a, b, c and d are the digital gain correction values for the grid points A, B, C and D, respectively.

5. The apparatus of claim 4, wherein the each grid point has associated therewith a digital gain correction value for each of a red (R) color channel, green1 (Gr) color channel, green2 (Gb) color channel, and a blue (B) color channel.

6. The apparatus of claim 3, wherein the subset of operations to approximate include a subset of operations to perform bilinear interpolation to calculate a set of interpolation factors (U,V) and an interpolated correction factor (ICF) for a respective one non-grid pixel (NGP) in the corresponding grid block defined by $$U=a+d1*(b-a)/BW;$$

$$V=c+d1*(d-c)/BW; \text{ and}$$

$$ICF=U+(V-U)*e1/BH,$$

where BW is a distance between horizontally aligned grid points A and B and grid points C and D of the corresponding grid block; BH is a distance between vertically aligned grid points A and C and grid points B and D of the corresponding grid block; e1 is a distance calculated from a NGP to an upper horizontal plane, of the corresponding grid block, having the horizontally aligned grid points A and B; d1 is calculated from a location of the NGP to a leading vertical plane, of the corresponding grid block, having the vertically aligned grid points A and C; and a, b, c and d are the digital gain correction values for the grid points A, B, C and D, respectively.

7. The apparatus of claim 6, wherein the 2D mesh has a total of W grid blocks in a horizontal direction and a horizontal index j and a vertical index are computed as $$j=x/2^M, \text{ and}$$

$$i=y/2^N;$$

and the digital gain correction values are defined as $$a=\text{LUT}[i*W+j],$$

$$b=\text{LUT}[i*W+j+1],$$

$$c=\text{LUT}[(i+1)*W+j] \text{ and}$$

$$d=\text{LUT}[(i+1)*W+j+1],$$

where LUT[ ] is a location in a mesh lookup table having associated therewith a respective one digital gain correction value a, b, c or d for the grid points A, B, C and D, respectively; M is the number of grid points in a horizontal direction of the 2D mesh; and N is the number of grid points in a vertical direction of the 2D mesh.

8. The apparatus of claim 3, wherein the subset of operations to approximate include a subset of operations to perform bilinear interpolation to calculate a set of interpolation factors (U,V) and an interpolated correction factor (ICF) for a respective one non-grid pixel (NGP) in the corresponding grid block defined by $$U=a+\text{accumulate}(\text{Delta\_Table}[Y\text{block},X\text{block}]);$$

$$V=c+\text{accumulate}(\text{Delta\_Table}[Y\text{block}+1,X\text{block}]); \text{ and}$$

$$ICF=U+(V-U)*\text{accumulate}(\text{Delta\_Height}),$$

where $$\text{delta\_table}[Y\text{block}, X\text{block}] = \left(\frac{CF[Y\text{block}, X\text{block}+1] - CF[Y\text{block}, X\text{block}]}{\text{Block\_width}}\right)$$

and
where the Block_width is a distance between horizontally aligned grid points A and B and grid points C and D of the corresponding grid block; Block_Height is a distance between vertically aligned grid points A and C and grid points B and D of the corresponding grid block; Delta_Table [Yblock, Xblock] represents a correction factor (CF) change slope on a top boundary edge of a block index (Yblock, Xblock); the top boundary edge is a horizontal line between two grid points, the grid point A to the grid point B; the Delta_Height equals 1/Block_Height; the accumulate(Delta_Height) is a function for calculating a summation of N Delta_Heights; N is the number of grid points in a vertical direction of the 2D mesh; and the a, b, c and d are the digital gain correction values for the grid points A, B, C and D, respectively.

9. The apparatus of claim 1, wherein the processing unit is a portion of a cellular phone, wireless device, wireless communications device, a video game console, a personal digital assistant (PDA), a laptop computer, or an audio/video-enabled device.

10. An integrated circuit comprising:
a processing unit to implement a set of operations to apply a two-dimensional (2D) mesh with a plurality of grid blocks over a distortion surface to approximate a lens roll-off distortion, and to adjust non-grid pixels (NGPs) in the distortion surface underlying a corresponding grid block based on the approximation for the corresponding grid block to correct for the lens roll-off distortion, wherein the lens roll-off distortion comprises the distortion of a lens' curvature; and
a memory coupled to the processing unit.

11. The integrated circuit of claim 10, wherein the set of operations which apply the 2D mesh includes a subset of operations to distribute a plurality of grid points among the distortion surface and determine a digital gain correction value to boost a brightness level for each grid point to a brightness level of a bright spot in the distortion surface, each grid block having a set of four grid points (A,B,C and D) located at each corner of the grid block to that adjacent grid blocks share a pair of grid points.

12. The integrated circuit of claim 11, wherein the set of operations to adjust further includes a subset of operations to approximate the lens roll-off distortion of any one pixel in the distortion surface between the set of grid points.

13. The integrated circuit of claim 12, wherein the subset of operations to approximate include a subset of operations to perform bilinear interpolation to calculate a set of interpolation factors (U,V) and an interpolated correction factor (ICF) for a respective one non-grid pixel (NGP) in the corresponding grid block defined by $$U=(d2*a+d1*b)/2^M;$$

$$V=(d2*c+d1*d)/2^M; \text{ and}$$

$$ICF=(U*e2+V*e1)/2^N$$

where $$d2=d1-2^M$$

$$e2=e1-2^N$$

and where M is the number of grid points in a horizontal direction of the 2D mesh; N is the number of grid points in a vertical direction of the 2D mesh; $2^m$ is a distance between horizontally aligned grid points A and B and grid points C and D of the corresponding grid block; $2^n$ is a distance between vertically aligned grid points A and C and grid points B and D of the corresponding grid block; e1 is a distance calculated from a NGP to an upper horizontal plane, of the corresponding grid block, having the horizontally aligned grid points A and B; d1 is calculated from a location of the NGP to a leading vertical plane, of the corresponding grid block, having the vertically aligned grid points A and C; and a, b, c and d are the digital gain correction values for the grid points A, B, C and D, respectively.

14. The integrated circuit of claim 13, wherein the each grid point has associated therewith a digital gain correction value for each of a red (R) color channel, green1 (Gr) color channel, green2 (Gb) color channel, and a blue (B) color channel.

15. The integrated circuit of claim 12, wherein the subset of operations to approximate include a subset of operations to perform bilinear interpolation to calculate a set of interpolation factors (U,V) and an interpolated correction factor (ICF) for a respective one non-grid pixel (NGP) in the corresponding grid block defined by $$U=a+d1*(b-a)/BW;$$

$$V=c+d1*(d-c)/BW; \text{ and}$$

$$ICF=U+(V-U)*e1/BH,$$

where BW is a distance between horizontally aligned grid points A and B and grid points C and D of the corresponding grid block; BH is a distance between vertically aligned grid points A and C and grid points B and D of the corresponding grid block; e1 is a distance calculated from a NGP to an upper horizontal plane, of the corresponding grid block, having the horizontally aligned grid points A and B; d1 is calculated from a location of the NGP to a leading vertical plane, of the corresponding grid block, having the vertically aligned grid points A and C; and a, b, c and d are the digital gain correction values for the grid points A, B, C and D, respectively.

16. The integrated circuit of claim 15, wherein the 2D mesh has a total of W grid blocks in a horizontal direction and a horizontal index j and a vertical index are computed as $$j=x/2^M, \text{ and}$$

$$i=y/2^N;$$

and the digital gain correction values are defined by $$a=\text{LUT}[i*W+j],$$

$$b=\text{LUT}[i*W+j+1],$$

$$c=\text{LUT}[(i+1)*W+j] \text{ and}$$

$$d=\text{LUT}[(i+1)*W+j+1],$$

where LUT[ ] is a location in a mesh lookup table having associated therewith a respective one digital gain correction value a, b, c or d for the grid points A, B, C and D, respectively; M is the number of grid points in a horizontal direction of the 2D mesh; and N is the number of grid points in a vertical direction of the 2D mesh.

17. The integrated circuit of claim 12, wherein the subset of operations to approximate include a set of operations to perform bilinear interpolation to calculate a set of interpolation factors (U,V) and an interpolated correction factor (ICF) for a respective one non-grid pixel (NGP) in the corresponding grid block defined by $$U=a+\text{accumulate}(\text{Delta\_Table}[Yblock,Xblock]);$$

$$V=c+\text{accumulate}(\text{Delta\_Table}[Yblock+1,Xblock]); \text{ and}$$

$$ICF=U+(V-U)*\text{accumulate}(\text{Delta\_Height})$$

where $$\text{delta\_table}[Yblock, Xblock] = \left(\frac{CF[Yblock, Xblock+1] - CF[Yblock, Xblock]}{Block\_width}\right)$$

and where the Block_width is a distance between horizontally aligned grid points A and B and grid points C and D of the corresponding grid block; Block_Height is a distance between vertically aligned grid points A and C and grid points B and D of the corresponding grid block; Delta_Table [Yblock, Xblock] represents a correction factor (CF) change slope on a top boundary edge of a block index (Yblock, Xblock); the top boundary edge is a horizontal line between two grid points, the grid point A to the grid point B; the Delta_Height equals 1/Block_Height; the accumulate(Delta_Height) is a function for calculating a summation of N Delta_Heights; N is the number of grid points in a vertical direction of the 2D mesh; and the a, b, c and d are the digital gain correction values for the grid points A, B, C and D, respectively.

18. The integrated circuit of claim 10, wherein the processing unit is a portion of a cellular phone, wireless device, wireless communications device, a video game console, a personal digital assistant (PDA), a laptop computer, or an audio/video-enabled device.

19. A non-transitory computer readable medium having instructions that when executed cause a computer to:
apply a two-dimensional (2D) mesh with a plurality of grid blocks over a distortion surface to approximate a lens roll-off distortion, wherein the lens roll-off distortion comprises the distortion of a lens' curvature; and
adjust non-grid pixels (NGPs) in the distortion surface underlying a corresponding grid block based on the approximation for the corresponding grid block to correct for the lens roll-off distortion.

20. The non-transitory computer readable medium of claim 19, wherein the instructions to apply the 2D mesh includes instructions to: distribute a plurality of grid points among the distortion surface; and determine a digital gain correction value to boost a brightness level for each grid point to a brightness level of a bright spot in the distortion surface; wherein each grid block has a set of four grid points (A, B, C and D) located at each corner of the grid block and adjacent grid blocks share a pair of grid points.

21. The non-transitory computer readable medium of claim 20, wherein the instructions to adjust further includes instructions to approximate the lens roll-off distortion of any one pixel in the distortion surface between the set of grid points.

22. The non-transitory computer readable medium of claim 21, wherein the instructions to approximate include instructions to perform bilinear interpolation to calculate a set of interpolation factors (U,V) and an interpolated correction factor (ICF) for a respective one non-grid pixel (NGP) in the corresponding grid block defined by $$U=(d2*a+d1*b)/2^M;$$

$$V=(d2*c+d1*d)/2^M; \text{ and}$$

$$ICF=(U*e2+V*e1)/2^N$$

where $$d2=d1-2^M$$

$$e2=e1-2^N$$

and where M is the number of grid points in a horizontal direction of the 2D mesh; N is the number of grid points in a vertical direction of the 2D mesh; $2^m$ is a distance between horizontally aligned grid points A and B and grid points C and D of the corresponding grid block; $2^n$ is a distance between vertically aligned grid points A and C and grid points B and D of the corresponding grid block; e1 is a distance calculated from a NGP to an upper horizontal plane, of the corresponding grid block, having the horizontally aligned grid points A and B; d1 is calculated from a location of the NGP to a leading vertical plane, of the corresponding grid block, having the vertically aligned grid points A and C; and a, b, c and d are the digital gain correction values for the grid points A, B, C and D, respectively.

23. The non-transitory computer readable medium of claim 22, wherein the each grid point has associated therewith a digital gain correction value for each of a red (R) color channel, green1 (Gr) color channel, green2 (Gb) color channel, and a blue (B) color channel.

24. The non-transitory computer readable medium of claim 21, wherein the instructions to approximate include instructions to perform bilinear interpolation to calculate a set of interpolation factors (U,V) and an interpolated correction factor (ICF) for a respective one non-grid pixel (NGP) in the corresponding grid block defined by $$U = a + d1*(b-a)/BW;$$

$$V = c + d1*(d-c)/BW; \text{ and}$$

$$ICF = U + (V-U)*e1/BH,$$

where BW is a distance between horizontally aligned grid points A and B and grid points C and D of the corresponding grid block; BH is a distance between vertically aligned grid points A and C and grid points B and D of the corresponding grid block; e1 is a distance calculated from a NGP to an upper horizontal plane, of the corresponding grid block, having the horizontally aligned grid points A and B; d1 is calculated from a location of the NGP to a leading vertical plane, of the corresponding grid block, having the vertically aligned grid points A and C; and a, b, c and d are the digital gain correction values for the grid points A, B, C and D, respectively.

25. The non-transitory computer readable medium of claim 24, wherein the 2D mesh has a total of W grid blocks in a horizontal direction and a horizontal index j and a vertical index are computed as $$j = x/2^M, \text{ and}$$

$$i = y/2^N;$$

and the digital gain correction values are defined by $$a = LUT[i*W+j],$$

$$b = LUT[i*W+j+1],$$

$$c = LUT[(i+1)*W+j] \text{ and}$$

$$d = LUT[(i+1)*W+j+1],$$

where LUT[ ] is a location in a mesh lookup table having associated therewith a respective one digital gain correction value a, b, c or d for the grid points A, B, C and D, respectively; M is the number of grid points in a horizontal direction of the 2D mesh; and N is the number of grid points in a vertical direction of the 2D mesh.

26. The non-transitory computer readable medium of claim 21, wherein the instructions to approximate include instructions to perform bilinear interpolation to calculate a set of interpolation factors (U,V) and an interpolated correction factor (ICF) for a respective one non-grid pixel (NGP) in the corresponding grid block defined by $$U = a + \text{accumulate}(\text{Delta\_Table}[Yblock, Xblock]);$$

$$V = c + \text{accumulate}(\text{Delta\_Table}[Yblock+1, Xblock]); \text{ and}$$

$$ICF = U + (V-U)*\text{accumulate}(\text{Delta\_Height}),$$

where $$\text{delta\_table}[Yblock, Xblock] = \left( \frac{CF[Yblock, Xblock+1] - CF[Yblock, Xblock]}{\text{Block\_width}} \right)$$

and where the Block_width is a distance between horizontally aligned grid points A and B and grid points C and D of the corresponding grid block; Block_Height is a distance between vertically aligned grid points A and C and grid points B and D of the corresponding grid block; Delta_Table [Yblock, Xblock] represents a correction factor (CF) change slope on a top boundary edge of a block index (Yblock, Xblock); the top boundary edge is a horizontal line between two grid points, the grid point A to the grid point B; the Delta_Height equals 1/Block_Height; the accumulate(Delta_Height) is a function for calculating a summation of N Delta_Heights; N is the number of grid points in a vertical direction of the 2D mesh; and the a, b, c and d are the digital gain correction values for the grid points A, B, C and D, respectively.

27. The non-transitory computer readable medium of claim 21, wherein the instructions to adjust simultaneously adjust for green channel imbalance.

28. A device comprising:
applying means for applying a two-dimensional (2D) mesh with a plurality of grid blocks over a distortion surface to approximate a lens roll-off distortion; and
adjusting means for adjusting non-grid pixels (NGPs) in the distortion surface underlying a corresponding grid block based on the approximation for the corresponding grid block to correct for the lens roll-off distortion, wherein the lens roll-off distortion comprises the distortion of a lens' curvature.

29. The device of claim 28, wherein the applying means includes distributing means for distributing a plurality of grid points among the distortion surface; and determining means for determining a digital gain correction value to boost a brightness level for each grid point to a brightness level of a bright spot in the distortion surface; wherein each grid block has a set of four grid points (A, B, C and D) located at each corner of the grid block and adjacent grid blocks share a pair of grid points.

30. The device of claim 29, wherein the adjusting means includes approximating means for approximating the lens roll-off distortion of any one pixel in the distortion surface between the set of grid points.

31. The device of claim 30, wherein the approximating means simultaneously adjusting for green channel imbalance.

32. A processor comprising:
applying means for applying a two-dimensional (2D) mesh with a plurality of grid blocks over a distortion surface to approximate a lens roll-off distortion, wherein the lens roll-off distortion comprises the distortion of a lens' curvature; and
adjusting means for adjusting non-grid pixels (NGPs) in the distortion surface underlying a corresponding grid block based on the approximation for the corresponding grid block to correct for the lens roll-off distortion.

33. The processor of claim 32, wherein the applying means includes distributing means for distributing a plurality of grid points among the distortion surface; and determining means for determining a digital gain correction value to boost a brightness level for each grid point to a brightness level of a bright spot in the distortion surface; wherein each grid block has a set of four grid points (A, B, C and D) located at each corner of the grid block and adjacent grid blocks share a pair of grid points.

34. The processor of claim 33, wherein the adjusting means further includes approximating means for approximating the lens roll-off distortion of any one pixel in the distortion surface between the set of grid points.

35. The processor of claim 34, wherein the approximating means simultaneously adjusting for green channel imbalance.

36. A method comprising:
applying a two-dimensional (2D) mesh with a plurality of grid blocks over a distortion surface to approximate a lens roll-off distortion, wherein the lens roll-off distortion comprises the distortion of a lens' curvature; and
adjusting non-grid pixels (NGPs) in the distortion surface underlying a corresponding grid block based on the approximation for the corresponding grid block to correct for the lens roll-off distortion.

37. The method of claim 36, wherein the applying includes distributing a plurality of grid points among the distortion surface; and determining a digital gain correction value to boost a brightness level for each grid point to a brightness level of a bright spot in the distortion surface; wherein each grid block has a set of four grid points (A, B, C and D) located at each corner of the grid block and adjacent grid blocks share a pair of grid points.

38. The method of claim 37, wherein the adjusting includes approximating the lens roll-off distortion of any one pixel in the distortion surface between the set of grid points.

39. The method of claim 38, wherein simultaneously with the approximating, further comprising adjusting for green channel imbalance.

* * * * *